US010294836B2

(12) United States Patent
Asakura et al.

(10) Patent No.: US 10,294,836 B2
(45) Date of Patent: May 21, 2019

(54) GROUNDING STRUCTURE FOR INTERNAL COMBUSTION ENGINE

(71) Applicant: ISUZU MOTORS LIMITED, Shinagawa-ku, Tokyo (JP)

(72) Inventors: Tsutomu Asakura, Atsugi (JP); Naoki Mizukami, Atsugi (JP); Daisuke Sueoka, Fuchu (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/775,348

(22) PCT Filed: Nov. 9, 2016

(86) PCT No.: PCT/JP2016/083230
§ 371 (c)(1),
(2) Date: May 10, 2018

(87) PCT Pub. No.: WO2017/082292
PCT Pub. Date: May 18, 2017

(65) Prior Publication Data
US 2018/0320567 A1    Nov. 8, 2018

(30) Foreign Application Priority Data

Nov. 12, 2015    (JP) .................................. 2015-222134

(51) Int. Cl.
*F02B 77/00*    (2006.01)
*F01M 1/20*    (2006.01)
(Continued)

(52) U.S. Cl.
CPC .............. *F01M 1/20* (2013.01); *B60R 16/02* (2013.01); *F02B 77/00* (2013.01); *F02B 77/08* (2013.01);
(Continued)

(58) Field of Classification Search
CPC .......... F01M 1/20; F01M 11/03; H01R 4/489; H01R 4/36; H01R 4/64; F02B 77/08; F02B 77/00; B60R 16/02; F16M 1/02
See application file for complete search history.

(56) References Cited

U.S. PATENT DOCUMENTS 4,175,223 A * 11/1979 Lauritsen ............... H01H 13/02
200/16 C
4,874,923 A * 10/1989 Hatanaka ............... F23Q 7/001
219/270

(Continued)

FOREIGN PATENT DOCUMENTS

JP    H06-019771 Y2    5/1994
JP    H10-035449 A    2/1998
(Continued)

OTHER PUBLICATIONS

International Search Report and Written Opinion for related PCT Application No. PCT/JP2016/083230 dated Feb. 7, 2017; 8 pages.

*Primary Examiner* — Thomas N Moulis
(74) *Attorney, Agent, or Firm* — Procopio, Cory, Hargreaves & Savitch LLP

(57) ABSTRACT

Provided is a grounding structure for an internal combustion engine, including a resinous body 2 configured to be attached to an engine body 7 and having a recessed portion 6 formed on a side thereof facing the engine body 7; a nut portion 13 integrally provided in the body 2, wherein the nut portion 13 includes a first end portion 13a opened into the recessed portion 6 and is made of a conductive material; and an oil pressure switch 5 configured to be attached to a second end portion 13b of the nut portion 13; and a conductive spring 16 arranged inside the recessed portion 6, wherein the conductive spring 16 is attached to the first end portion 13a of the nut portion 13 and is pressed against the engine body 7.

7 Claims, 2 Drawing Sheets

(51) Int. Cl.
    *B60R 16/02*     (2006.01)
    *F16M 1/02*     (2006.01)
    *H01R 4/64*     (2006.01)
    *F02B 77/08*     (2006.01)
    *H01R 4/36*     (2006.01)
    *H01R 4/48*     (2006.01)
    *F01M 11/03*     (2006.01)

(52) U.S. Cl.
    CPC ............... *F16M 1/02* (2013.01); *H01R 4/36* (2013.01); *H01R 4/489* (2013.01); *H01R 4/64* (2013.01); *F01M 11/03* (2013.01)

(56) References Cited

U.S. PATENT DOCUMENTS

| | | | | |
|---|---|---|---|---|
| 4,962,285 A * | 10/1990 | Baker | ............... | E04H 4/144 |
| | | | | 174/6 |
| 5,741,143 A * | 4/1998 | Hotea | ............ | G01D 11/245 |
| | | | | 439/86 |
| 6,257,188 B1 | 7/2001 | Fujii et al. | | |
| 10,036,315 B2 * | 7/2018 | Osawa | ............ | F16H 59/68 |
| 2006/0005809 A1 * | 1/2006 | Kado | ............ | F02D 9/1035 |
| | | | | 123/399 |
| 2007/0247143 A1 * | 10/2007 | Ikeda | ............ | F02D 9/105 |
| | | | | 324/207.25 |
| 2014/0116931 A1 * | 5/2014 | Beer | ............ | F01M 11/0004 |
| | | | | 210/196 |
| 2015/0059584 A1 * | 3/2015 | Steins | ............ | B01D 46/0005 |
| | | | | 96/417 |
| 2016/0363204 A1 * | 12/2016 | Paielli | ............ | F16H 48/34 |
| 2018/0022497 A1 * | 1/2018 | Fasold | ............ | B65D 1/42 |
| | | | | 220/200 |
| 2018/0302998 A1 * | 10/2018 | Albert | ............ | H05K 5/0082 |

FOREIGN PATENT DOCUMENTS

| | | |
|---|---|---|
| JP | H10-302592 A | 11/1998 |
| JP | 2000-145543 A | 5/2000 |
| JP | 2001-271623 A | 10/2001 |
| JP | 2008-303811 A | 12/2008 |
| JP | 2012-246887 A | 12/2012 |
| JP | 2012-246888 A | 12/2012 |

\* cited by examiner

[FIG. 1]
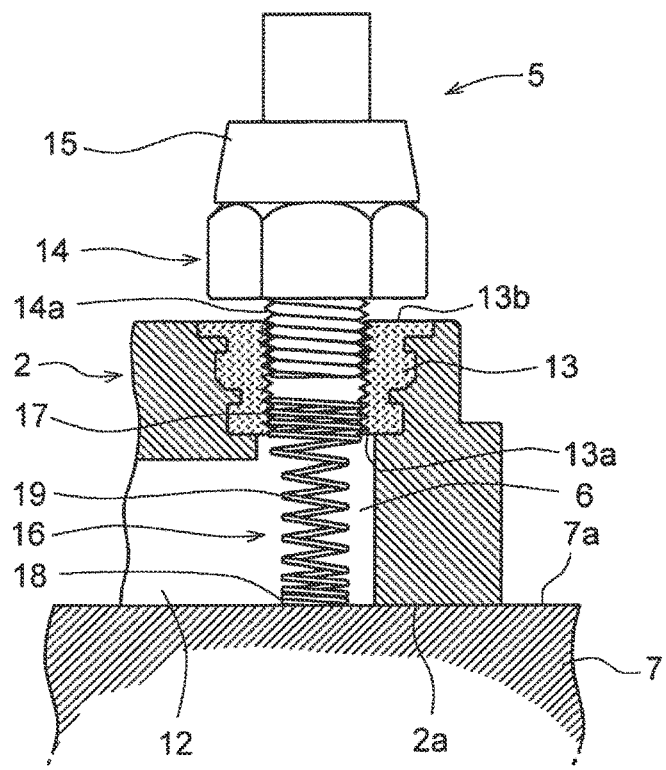
[FIG. 2]
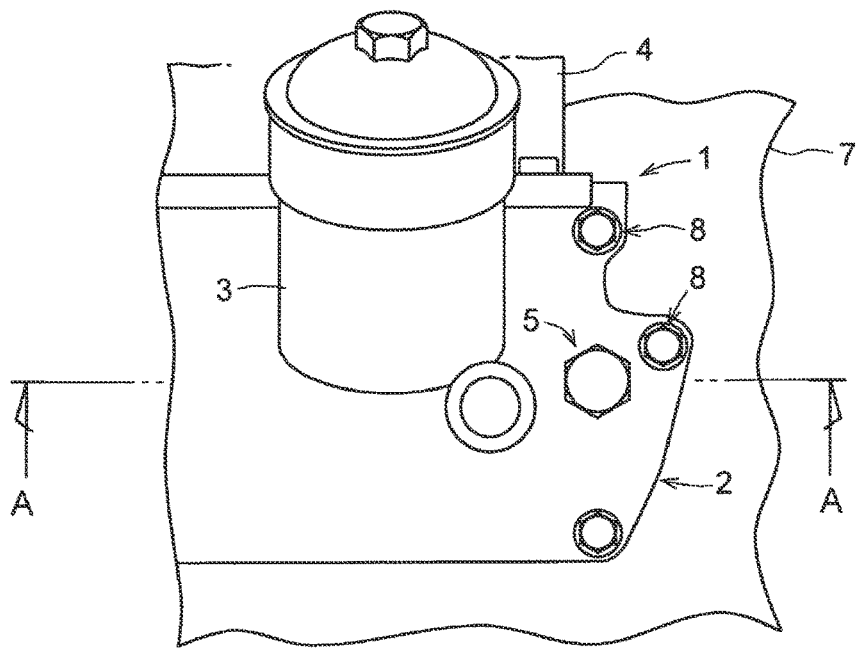

[FIG. 3]
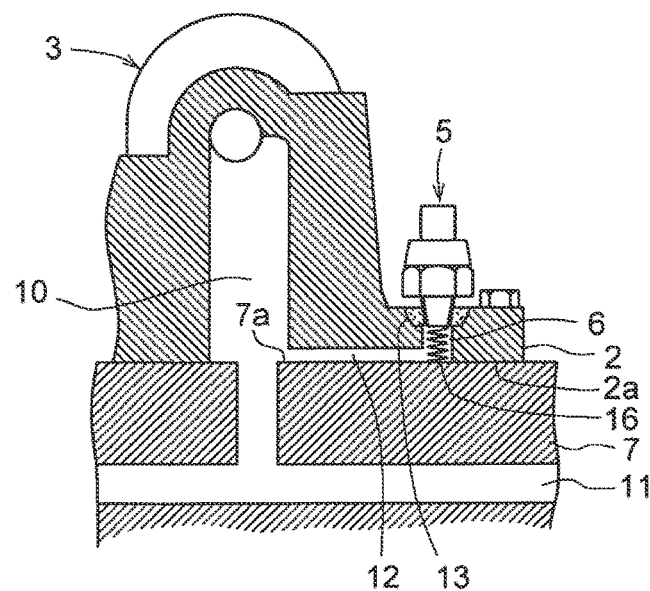
[FIG. 4]
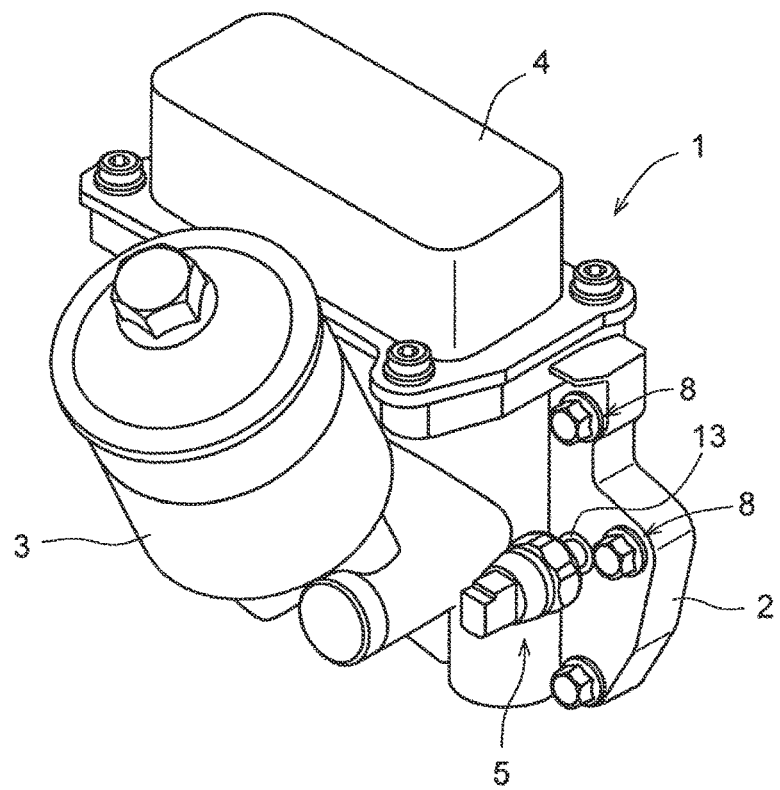

GROUNDING STRUCTURE FOR INTERNAL COMBUSTION ENGINE

CROSS-REFERENCE TO RELATED APPLICATIONS

This application is a U.S. National Stage entry of PCT Application No: PCT/JP2016/083230 filed Nov. 9, 2016, which claims priority to Japanese Patent Application No. 2015-222134, filed Nov. 12, 2015, the contents of which are incorporated herein by reference.

TECHNICAL FIELD

The present disclosure relates to a grounding structure for an internal combustion engine.

BACKGROUND ART

In a related art, on an engine body including a cylinder block and the like, an oil pressure switch as an electric component and also an oil filter assembly are attached. The oil pressure switch is directly attached to the cylinder block and thus is body-grounded. Also, the oil filter assembly is formed by mounting a plurality of components, such as an oil filter, on a metal body.

CITATION LIST

Patent Literature

PTL 1: Japanese Patent Application Publication No. 2001-271623

SUMMARY OF INVENTION

Technical Problem

However, it is conceived that for the sake of simplification, the oil pressure switch is attached to the body of the oil filter assembly and also for sake of weight reduction, the body is formed of resin. In this case, the oil pressure switch is not electrically connected to the cylinder block, and thus there is a possibility that the oil pressure switch cannot be body-grounded.

An object of the present disclosure is to provide a grounding structure for an internal combustion engine, in which it is possible to ground an electric component even if the electric component is attached to a resinous body.

Solution to Problem

In order to achieve the above object, the present disclosure provides a grounding structure for an internal combustion engine, including a resinous body configured to be attached to an engine body and having a recessed portion formed on a side thereof facing the engine body; a nut portion integrally provided in the body and opened to the recessed portion; an electric component configured to be attached on a side of the nut portion opposite to the recessed portion; and a conductive spring provided in the nut portion to extend toward the recessed portion and configured to be pressed against the engine body.

Advantageous Effects of Invention

According to the grounding structure for the internal combustion engine of the present disclosure, it is possible to ground an electric component even if the electric component is attached to a resinous body.

BRIEF DESCRIPTION OF DRAWINGS

FIG. 1 is an enlarged sectional view showing a main part of an oil filter assembly employing a grounding structure according to one embodiment of the preset disclosure.

FIG. 2 is a front view showing the oil filter assembly.

FIG. 3 is a sectional view as viewed from an A-A arrow direction in FIG. 2.

FIG. 4 is a perspective showing the oil filter assembly.

DESCRIPTION OF EMBODIMENTS

Hereinafter, preferred embodiments of the present disclosure will be described with reference to the accompanying drawings.

As shown in FIGS. 2 and 4, an oil filter assembly 1 includes a body (main body) 2 formed of resin; an oil filter 3 provided on the body 2; an oil cooler 4 provided on the body 2; an oil pressure switch 5 as an electric component provided on the body 2.

The body 2 is fastened to an engine body 7 (specifically, a cylinder block) of a diesel engine, which is an internal combustion engine, by a plurality of bolts 8.

As shown in FIG. 3, the body 2 has an oil introduction passage 10 formed to introduce an engine oil into the oil filter 3 and the oil cooler 4, and an oil return passage (not shown) formed to return the engine oil to the engine body 7.

The oil introduction passage 10 is connected to an oil gallery 11 of the engine body 7, so that the engine oil is introduced from the oil gallery 11 into the oil filter 3 and the oil cooler 4. Also, in a mounting surface 2a of the body 2, an oil pressure introduction passage 12 for introducing an oil pressure into the oil pressure switch 5 is formed to be branched from the oil introduction passage 10.

The oil pressure introduction passage 12 is communicated with a recessed portion 6 formed in the mounting surface 2a of the body 2. The oil pressure introduction passage 12 and a lower opening of the recessed portion 6 are closed when the body 2 is attached to the engine body 7.

Further, as shown in FIGS. 1 and 4, the body 2 has a nut portion 13 integrally provided to allow the oil pressure switch 5 to be attached thereto. The nut portion 13 is formed as a tapered nut made of a conductive material, such as metal, and has a first end portion 13a opened into the recessed portion 6 and a second end portion 13b configured to face the oil pressure switch 5 when the oil pressure switch 5 is attached thereto. Specifically, the nut portion 13 is configured such that the first end portion 13a is positioned inside the recessed portion 6 and thus an oil pressure can be introduced up to the oil pressure switch 5 screwed in the nut portion 13.

The oil pressure switch 5 has a fastened body 14 to be fastened to the nut portion 13, and a sensor portion 15 provided on the fastened body 14. The fastened body 14 is made of a conductive material, such as metal. The fastened body 14 has a threaded portion 14a configured to be liquid-tightly fastened to the nut portion 13. The threaded portion 14a is formed as a tapered thread. A center hole (not shown), through which the engine oil is introduced, is formed in the threaded portion 14a, so that the oil pressure can be supplied to the sensor portion 15. Alternatively, a lower surface of the fastened body 14 may be configured to face the second end portion 13b of the nut portion 13 while being spaced therefrom in an axial direction when the threaded portion 14a is fastened to the nut portion 13.

Further, an engine control unit (hereinafter, ECU; not shown) is connected to the oil pressure switch 5 via a harness (not shown). The ECU is configured to turn on an oil pressure warning lamp (not shown) in response to an oil pressure detected by the oil pressure switch 5.

As shown in FIGS. 1 and 3, a conductive spring 16 for electrically connecting and grounding the oil pressure switch 5, which is fastened to the nut portion 13, to the engine body 7 is provided inside the recessed portion 6. Herein, the internal combustion engine is mounted on a vehicle and the engine body 7 of the internal combustion engine is electrically connected to a vehicle body of the vehicle (not shown). The vehicle body is electrically connected to a negative pole of a battery (not shown) and the oil pressure switch 5 is electrically connected and grounded to the engine body 7 via the nut portion 13 and the conductive spring 16.

The conductive spring 16 is formed as a coil spring made of a conductive material, such as metal, and is arranged inside the recessed portion 6 so as to be coaxially arranged with the nut portion 13. The conductive spring 16 has one end portion 17 configured to be screwed and attached to the first end portion 13a of the nut portion 13; the other end portion 18 configured to be pressed against the engine body 7; and a stretchable intermediate portion 19 arranged between the one end portion 17 and the other end portion 18. The one end portion 17 is spaced apart from the oil pressure switch 5 in the axial direction of the nut portion 13, so as not to interfere with the oil pressure switch 5. The other end portion 18 is processed in a flat surface shape at a tip thereof, so as to be pressed against an outer surface 7a of the engine body 7 while being in surface contact therewith. Also, the other end portion 18 has a pitch smaller than that of the intermediate portion 19.

The conductive spring 16 is formed to have such a length that the other end portion 18 protrudes from the body 2 before the body 2 is attached to the engine body 7.

Alternatively, the conductive spring 16 may not be the coil spring as long as introduction of an oil pressure into the oil pressure switch 5 is not obstructed and also separation thereof from the nut portion 13 can be prevented.

Next, the operation of the present embodiment will be described.

As shown in FIGS. 2 and 3, in a case where the oil filter assembly 1 is attached to the engine body 7, the conductive spring 16 is previously attached to the oil filter assembly 1. When the conductive spring 16 is attached to the oil filter assembly 1, the conductive spring 16 is inserted into the recessed portion 6 of the oil filter assembly 1 and then the one end portion 17 thereof is screwed and attached to the nut portion 13. At this time, since the conductive spring 16 is formed to have such a length that the other end portion 18 protrudes from the body 2, the conductive spring 16 can be easily attached by gripping and turning the other end portion 18.

Subsequently, the body 2 of the oil filter assembly 1 is fastened to the engine body 7 by the bolts 8. The conductive spring 16 is formed to have such a length that the other end portion 18 protrudes from the body 2 before the body 2 is attached to the engine body 7. Therefore, as the other end portion 18 is pressed by the outer surface 7a of the engine body 7, the conductive spring 16 is retracted in the axial direction and thus pressed against the outer surface 7a. The other end portion 18 has a pitch smaller than that of the intermediate portion 19 and thus is hardly bent. Therefore, the other end portion 18 comes not partially in contact with the engine body 7, but in surface contact with the engine body 7 over the entire end surface thereof.

As a result, the oil pressure switch 5 can be grounded to the engine body 7 via the nut portion 13 and the conductive spring 16. Also, an oil pressure can be detected using the oil pressure switch 5.

As described above, the conductive spring 16 is provided to be arranged inside the recessed portion 6 in such a manner that the conductive spring 16 is attached to the first end portion 13a of the nut portion 13 and also pressed against the engine body 7. Therefore, the oil pressure switch 5 can be electrically grounded (earthed), even if the body 2 of the oil filter assembly 1 is made of resin. Also, since the conductive spring 16 is arranged inside the recessed portion 6 of the body 2, it is possible to prevent conduction failure from occurring due to rusting of the conductive spring 16 by the outside air.

Further, the conductive spring 16 has the one end portion 17 configured to be screwed and attached to the first end portion 13a of the nut portion 13. Therefore, the conductive spring 16 can be attached to the nut portion 13 by a simple work of only screwing the conductive spring 16 into the nut portion 13.

Since the other end portion 18 has a pitch smaller than that of the intermediate portion 19, the other end portion 18 is hardly bent. Therefore, the other end portion 18 can come not partially in contact with the engine body 7, but in surface contact with the engine body 7 over the entire end surface thereof.

Meanwhile, although the case where the oil pressure switch 5 is provided on the nut portion 13 provided on the resinous body 2 of the oil filter assembly 1 has been described in the foregoing embodiments, the preset disclosure is not limited thereto. The electric component may be any component other than the oil pressure switch 5, and also the body may not be the body 2 of the oil filter assembly 1. Likewise, the assembly may be any assembly other than the oil filter assembly.

Also, the resinous body 2 may be provided on any other engine structural parts of the engine body 7. As used herein, the term "engine structural part" refers to an engine structural part, such as a cylinder block, a crankcase and a cylinder head, and also means a body-grounded part made of a conductive material.

Also, although the engine body 7 has been described as a diesel engine, the engine body 7 may be any other internal combustion engines, such as a gasoline engine.

This application is based on Japanese Patent Application No. 2015-222134 filed on Nov. 12, 2015, the entire contents of which are incorporated herein by reference.

INDUSTRIAL APPLICABILITY

The present invention has the effect that it is possible to ground an electric component even if the electric component is attached to a resinous body, and thus is useful for a grounding structure for an internal combustion engine and the like.

REFERENCE SIGNS LIST

2: Body
5: Oil pressure switch (electric component)
6: Recessed portion
7: Engine body
13: Nut portion
13a: First end portion 13b: Second end portion
16: Conductive spring

The invention claimed is:

1. A grounding structure for an internal combustion engine, comprising:
   a resinous body configured to be attached to an engine body and having a recessed portion formed on a side thereof facing the engine body;
   a nut portion integrally provided in the body, the nut portion having a first end portion opened into the recessed portion, the nut portion being made of a conductive material;
   an electric component configured to be attached to a second end portion of the nut portion; and
   a conductive spring arranged inside the recessed portion, the conductive spring being attached to the first end portion of the nut portion and being pressed against the engine body.

2. The grounding structure according to claim 1,
   wherein the recessed portion forms an oil passage, and
   wherein the electric component is an oil pressure switch configured to detect an oil pressure of the oil passage.

3. The grounding structure according to claim 1,
   wherein the conductive spring is formed as a coil spring coaxially arranged with the nut portion, and
   wherein the conductive spring includes:
      one end portion configured to be screwed and attached to the first end portion of the nut portion;
      the other end portion configured to be pressed against the engine body; and
      an intermediate portion arranged between the one end portion and the other end portion.

4. The grounding structure according to claim 3, wherein the other end portion has a pitch smaller than that of the intermediate portion.

5. The grounding structure according to claim 3,
   wherein the electric component includes a conductive threaded portion configured to be attached to the nut portion, and
   wherein the one end portion of the conductive spring is spaced apart from the threaded portion in an axial direction thereof.

6. The grounding structure according to claim 1, wherein the electric component includes a fastened body having a lower surface configured to face the second end portion of the nut portion while being spaced therefrom in an axial direction when being attached to the nut portion.

7. The grounding structure according to claim 1,
   wherein the electric component includes a conductive threaded portion configured to be fastened to the second end portion of the nut portion so as to be electrically connected to the nut portion,
   wherein the electric component has a lower surface configured to face the second end portion of the nut portion while being spaced therefrom in an axial direction when the threaded portion is fastened to the second end portion of the nut portion,
   wherein the conductive spring includes:
      one end portion configured to be screwed and attached to the first end portion of the nut portion so as to be electrically connected to the nut portion; and
      the other end portion configured to be pressed against the engine body so as to be electrically connected to the engine body,
   wherein the conductive spring is coaxially arranged with the nut portion, and
   wherein the one end portion of the conductive spring is spaced apart from the threaded portion in an axial direction thereof.

* * * * *